COLOR TELEVISION RECEIVER USING SWITCHED SYNCHRONOUS DEMODULATOR

Original Filed Oct. 15, 1964 2 Sheets-Sheet 1

INVENTOR.
DONALD M. SANDLER

BY Brown and Mikulka

ATTORNEYS

May 7, 1968 D. M. SANDLER 3,382,317

COLOR TELEVISION RECEIVER USING SWITCHED SYNCHRONOUS DEMODULATOR

Original Filed Oct. 15, 1964 2 Sheets-Sheet 2

INVENTOR.
DONALD M. SANDLER

BY *Brown and Mikulka*

ATTORNEYS

United States Patent Office 3,382,317

Patented May 7, 1968

3,382,317

COLOR TELEVISION RECEIVER USING SWITCHED SYNCHRONOUS DEMODULATOR

Donald M. Sandler, Oak Park, Ill., assignor to Polaroid Corporation, Cambridge, Mass., a corporation of Delaware Original application Oct. 15, 1964, Ser. No. 404,047. Divided and this application Oct. 20, 1965, Ser. No. 498,887

1 Claim. (Cl. 178—5.4)

This application is a division of copending parent application Ser. No. 404,047 filed Oct. 15, 1964.

This invention relates to decoders for recovering color information from color television signals transmitted in accordance with the technical standards established by the Federal Communications Commission in 1953, and more particularly to a decoder designed to recover from such signals, sufficient color information for a one-gun kinescope to be operated according to the red-white system of color analysis to produce a color picture of the scene being televised.

The red-white system of color analysis requires the relatively long wavelength (i.e., red) content of a scene to be displayed in reddish colored light and the relatively short wavelength (i.e., green) content of the scene to be displayed in achromatic light. A one-gun kinescope that operates according to this system of color analysis to produce a color picture of a scene being televised is disclosed in copending application Ser. No. 297,341, filed July 24, 1963, now Patent No. 3,290,434 owned by the assignee of this application. Briefly, such kinescope includes a target screen whose covering comprises two superposed cathodoluminescent layers that emit red and cyan light respectively when excited by a beam of electrons. When the accelerating voltage of the kinescope is adjusted to provide a beam with a relatively low level of energy, electrons can penetrate only into the red layer, which is closer to the gun, causing the color of the light on the screen to be red; and when the voltage is adjusted to provide a beam with a particular relatively higher level, electrons can penetrate into the cyan layer simultaneously exciting both layers to produce red and cyan light in such relative proportions that the light on the screen appears to be achromatic.

To reproduce a scene in color with a one-gun kinescope such as this, it is necesary to apply the red video signal to the gun when the accelerating voltage is adjusted to provide the lower energy beam; and to apply the green video signal to the gun when the accelerating voltage is adjusted to provide the higher energy beam. This involves a sequential switching of the video signal applied to the gun between the red and green in synchronism with the sequential switching of the adjustment to the accelerating voltage. When the switching occurs at the field frequency the result is a field sequential color system in which a color frame corresponds to a scanning frame. In view of the fact that only red and green video signals are necessary to the red-white system, and, with a one-gun kinescope, that such video signals are required sequentially, it is readily apparent that the standard color television signal, from which information on the red, green and blue content of each picture element can be obtained simultaneously, will provide more color information than is actually needed. This suggests that conventional decoding processes, such as those associated with tri-color kinescopes and which can recover the simultaneous red, green and blue signals contained in a standard color signal, can be coupled with a properly synchronized gating circuit in order to sequentially apply the proper one of either the red or green video signals to the kinescope gun. While satisfactory operation will be achieved, this approach fails to take advantage of particular properties of both the standard transmitted signal and the red-white system of color analysis which permit a much simpler decoder to be utilized. It is the provision of a decoder of this type that constitutes the primary object of the present invention.

Before briefly describing the present invention, the components of a transmitted color television signal that meets the technical standards of the FCC will be reviewed in order to provide an antecedent basis for the terminology used in this disclosure. Basically, the standard broadcast color signal has a portion which conveys only brightness information and is independent of the color of the scene being televised; and a portion which conveys only color information and is independent of the brightness of the scene. Brightness information is supplied by a luminance or Y signal matrixed from the video signals derived from the synchronized and simultaneous scanning of red, green and blue color-separation images of the scene in proportion to the contribution of each color to brightness. The Y signal has a 4 mc. bandwidth and will produce a high quality monochrome picture on the viewing screen of a tri-color receiver. Color is added to this monochrome picture by the I and Q signals which constitute the color information portion of the broadcast signal. The bandwidths of the I and Q signals and the precise manner in which they are matrixed from the primary color video signals, provide the monochrome picture with only so much of the red, green and blue content of each picture element as is necessary for the reproduced scene as a whole to be interpreted by an average observer as being in full color. In large colored areas of the scene, which produce video frequencies less than 0.5 mc., the average observer easily resolves all three primary colors; and all three signals must be present in this frequency range to permit the large areas to be reproduced in full three-color fidelity with a tri-color kinescope. In medium sized colored areas which produce video frequencies between 0.5 and 1.5 mc., the average observer delineates most sharply between orange-red and blue-green; so that only two signals need be present in this frequency range to permit this special two-color reproduction of medium sized areas. Accordingly, the Q signal is the narrow band chrominance component and is bandlimited to 0.5 mc.; while the I signal is the wideband chrominance component whose frequency extends to 1.5 mc. and is matrixed from the primary color video signals to provide color information along the orange-red to blue-green axis of the chromaticity diagram. For fine colored detail, which produce video frequencies exceeding 1.5 mc., resolution is by way of variation in brightness, so that only the Y signal need be present.

Having established the minimum information which is required for reasonable reproduction of the scene in color, the three signals are so coded that the broadcast color television signal simultaneously transmits the luminance (brightness), dominant wavelength (hue), and purity (freedom from dilution by white light) coordinates of the scanned picture element. The I and Q signals provide the latter coordinates because of the manner in which the FCC signal is broadcast. The broadcast signal is required to correspond to a luminance component (the Y signal) transmitted as amplitude modulation of the main picture carrier of the television channel and a simultaneous pair of chrominance components (the I and Q signals) transmitted as the amplitude modulation sidebands of a pair of suppressed subcarriers in phase quadrature having the common frequency relative to the picture carrier of 3.58 mc. To develop this required color signal, the total video voltage which is modulated on the main picture carrier (not including sync and blanking information) includes the Y signal, already described, and a chrominance signal obtained by generating a 3.58 mc. color subcarrier, splitting it into subcarrier components that are in phase quadrature and modulating each of the I and Q signals on a different one of the subcarrier components using a suppressed subcarrier modulation technique. The resultant signal, containing only the sidebands of the two quadrature subcarrier components, is termed the coded chrominance signal. It is in the form of a 3.58 mc. subcarrier whose amplitude, when a given picture element is being scanned, is a measure of the product of the luminance and purity of the element, and whose phase is a measure of the dominant wavelength of the scanned element. Roughly, it can be considered that the amplitude of the chrominance signal determines the saturation of the color to be reproduced and the phase determines the dominant wavelength.

Since suppressed subcarrier transmission is involved, recovery of the intelligence contained in the chrominance signal involves a synchronous demodulation process which requires, in one standard approach to decoding, creating at the decoder, two 3.58 mc. subcarriers in phase quadrature. The latter may be developed by splitting the output of a suitable stable local oscillator of the required frequency into quadrature components to define a pair of decoder subcarriers; but phase information must be available if the phases of the latter are to be related to the phases of the two subcarrier components of the color subcarrier. To provide such information, a burst of the color subcarrier is gated onto the back porch interval of the horizontal blanking pulses which are generated at the transmitter for line sync purposes. The burst is used at a receiver in an automatic phase control loop to reference the phase of the output of the local oscillator to the phase of the burst.

As indicated above, the video voltage $E_m$ used to modulate the main picture carrier is the sum of the Y signal and the chrominance signal $E_c$. The latter can be expressed mathematically as follows:

$$E_c = I\cos(\omega t + 33^\circ) + Q\sin(\omega t + 33^\circ) \qquad (1)$$

where $$I = -0.27(B-Y) + 0.74(R-Y) \qquad (2)$$

$$Q = 0.41(B-Y) + 0.48(R-Y) \qquad (3)$$

$$Y = 0.3R + 0.59G + 0.11B \qquad (4)$$

$R$=video signal dependent on red content of picture element
$G$=video signal dependent on green content of picture element
$B$=video signal dependent on blue content of picture element
$R-Y$=red color difference signal which is a measure of the red content of a picture element less all brightness information
$B-Y$=blue color difference signal
$\omega$=angular frequency of the color subcarrier, radians per second
$t$=time, seconds.

The phase reference in Eq. 1 is the phase of the burst plus 180°. Since the I phasor leads the Q phasor by 90°, it follows that the phase of the color subcarrier (burst) must lag the I and Q signals by 303° (180°+123°) and 213° (180°+33°) respectively. This is accomplished in practice by causing the phases of the components of the color subcarrier on which the I and Q signals are modulated to lag the burst by 57° and 147° respectively.

Below 500 kc., which is the only frequency range in which the Y, I and Q signals can exist simultaneously, the chrominance signal has the following form:

$$E_c = \frac{R-Y}{1.14}\cos\omega t + \frac{B-Y}{2.03}\sin\omega t \qquad (5)$$

$$= |E_c|\sin(\omega t + \phi) \qquad (6)$$

where:

$|E_c|$=magnitude of the coded chrominance signal $$= \left[\left(\frac{R-Y}{1.14}\right)^2 + \left(\frac{B-Y}{2.03}\right)^2\right]^{1/2} \qquad (7)$$

$\phi$=phase angle of the coded chrominance signal $$= \tan^{-1}\left(\frac{R-Y}{1.14}\right) \times \left(\frac{2.03}{B-Y}\right) \qquad (8)$$

As can be seen by inspection of Eq. 6, the coded chrominance signal is indeed in the form of a 3.58 mc. subcarrier modulated in both amplitude and phase according to the color content of the picture elements. The phase of the coded chrominance signal Eq. 8, is an angle whose tangent is proportional to the ratio of two color difference signals, so that the angle associated with a scanned picture element is independent of the saturation of the primary color components of such picture element, and dependent only on the dominant wavelength of the light emanating from the element. It will be recalled that the dominant wavelength of colored light is the wavelength of homogeneous spectral light that must be mixed with achromatic light to achieve a visual match with the colored light. The variation of phase of a coded chrominance signal for a number of important colors is indicated in Chart A:

CHART A

| Color | Normalized primary color video signal | | | Y | $\phi$, degrees | Chrominance phasor leads burst by, degrees |
|---|---|---|---|---|---|---|
| | R | G | B | | | |
| Saturated red | 1 | 0 | 0 | 0.3 | 103.5 | 283.5 |
| Saturated green | 0 | 1 | 0 | 0.59 | 240.7 | 60.7 |
| Saturated blue | 0 | 0 | 1 | 0.11 | 347 | 167 |
| Saturated cyan | 0 | 1 | 1 | 0.70 | 283.5 | 103.5 |

The synchronous demodulation of a coded chrominance signal of the form shown in Eq. 6 with a reference signal at the color subcarrier frequency and a phase $\phi_x$ is termed synchronous demodulation at $+\phi_x°$. The output of a synchronous demodulator is proportional to the product of the magnitude of the coded chrominance signal and the cosine of the angle between the phasor representing the chrominance signal and the phasor representing the reference signal. If the signal obtained as a result of synchronous demodulation at $\phi_x°$ is termed $e_x$, then:

$$e_x = |E_c|\cos(\phi - \phi_x) \qquad (9)$$

where the angle $\phi$ is a function of the dominant wavelength of the scanned picture element as already indicated. From the definitions of Eqs. 6 and 7 and trigonometric identities, Eq. 9 reduces to:

$$e_x = \frac{R-Y}{1.14}\sin\phi_x + \frac{B-Y}{2.03}\cos\phi_x \qquad (10)$$

$$= (rR) + (gG) + (bB) \qquad (11)$$

where $$r = 0.63\sin(\phi_x - 13.5^\circ) \qquad (12)$$

$$g = -0.59\sin(\phi_x + 29^\circ) \qquad (13)$$

$$b = -0.45\sin(\varphi_x - 77^\circ) \qquad (14)$$

By simultaneous synchronous demodulation of separate portions of the coded chrominance signal with a pair of decoder subcarriers at different angles, two detected signals are simultaneously developed, each of which provides a single equation in three unknowns, namely, R, G and B which represent the red, green and blue luminances in the scanned picture element. The third simultaneous equation in the same three unknowns is the Y signal. Matrixing of the two detected signals with the Y signal (simultaneous solution) actually provides the quantities R, G and B which can be applied to the red, green and blue guns of a tri-color kinescope. It should be noted that synchronous demodulation at 123° and 33° provides the I and Q signals respectively, and this process is sometimes referred to as demodulation along the I and Q axes. The equations in the three unknown luminances resulting from synchronous demodulation along significant axes, and obtained from Eq. 8, are listed in chart B:

CHART B

| $\phi_x$, ° | Phase relative to burst, ° | Axis | $e_x$ |
|---|---|---|---|
| 0 | −180 | "$B-Y$" | $0.49\ (B-Y)$ |
| 90 | −90 | "$R-Y$" | $0.877\ (R-Y)$ |
| 103.5 | −76.5 | "Red" | $0.63\ R-0.43\ G-0.20\ B$ |
| 123 | −57 | "I" | $0.60\ R-0.28\ G-0.32\ B$ |
| 236.8 | −303.2 | "$G-Y$" | $1.42\ (G-Y)$ |
| 241 | −299 | "Green" | $-0.46\ R+0.59\ G-0.13\ B$ |

To appreciate the invention which is the subject matter of the present application, it should be recalled that a one-gun kinescope requires the sequential presentation to the gun of the decoder red video and the decoder green video. In a simultaneous transmission and decoding system which uses a single synchronous demodulator to produce the decoder red and green signals simultaneously, it is conventional to employ some type of switching arrangement by which one at a time of the two available video signals is sequentially applied to the gun. This invention, then, involves a recognition that the two desired and unadulterated video signals can be obtained sequentially from a coded chrominance signal containing simultaneous information on the red, green and blue content of a scanned picture element by synchronously demodulating the coded chrominance signal, sequentially, at predetermined angles that produce the desired unadulterated video signals. With this approach, the demodulator itself performs the switching function thus reducing the decoder complexity while at the same time permitting recovery of unadulterated red and green video signals. For example, synchronous demodulation can be carried out at the field frequency along the $R-Y$ axis and the $G-Y$ axis to obtain the red and green color difference signals by shifting the phase of the decoder subcarrier relative to the burst from −90° to −303.2° (see Chart A) with a square wave synchronized with the vertical sync pulses. Dematrixing to obtain the red and green signals can then be accomplished using a keyed matrix-amplifier to provide the proper channel gain associated with demodulation on these two axes, and using the kinescope to add the inverted luminance signal to the two color difference signals as they are applied sequentially to the grid of the kinescope. Since the net voltage controlling the beam is the grid-to-cathode voltage, the kinescope itself adds the luminance signal to each of the color difference signals permitting the unadulterated red and green video signals to be applied, sequentially, to excitation of the cathodoluminescent elements of the target.

One of the broadest views of the present invention is essentially that a sequential pair of video signals, individually representative of two different color characteristics of the scene being televised, can be recovered from the FCC approved signal by sequentially synchronously demodulating the chrominance signal at two different angles selected such that keyed, individual matrixing of the sequential pair of demodulated signals with the luminance signal provides the sought after sequential pair of video signals.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claim appended hereto. Those skilled in the art will appreciate that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

For a fuller understanding of the nature and objects of the invention, reference should be had to the following detailed description taken in connection with the accompanying drawings wherein:

FIG. 2(*b*) is a phase diagram of the coded chrominance signal showing the results obtained by synchronous demodulation of the signal at three different angles;

Figure 1:
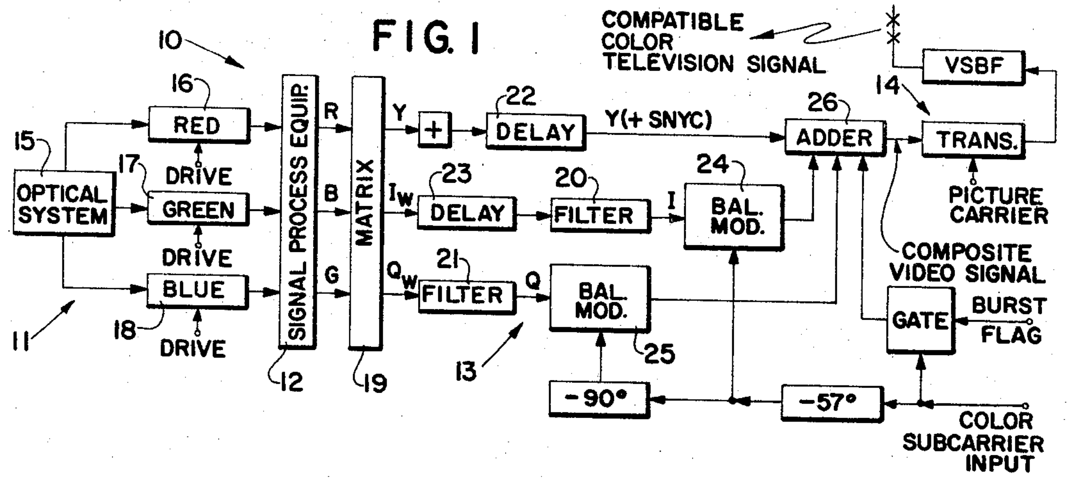
FIGURE 1 is a block diagram of transmitter apparatus for coding the red, green and blue video signals individually associated with the scans of the three color-separation images according to FCC regulations to produce and transmit a composite video signal made up of luminance signal and a phase and amplitude modulated chrominance signal.

Referring now to FIGURE 1, reference numeral 10 designates equipment for generating and transmitting color television signals in accordance with the technical standards established by the Federal Communications Commission. Such equipment forms no part of the present invention, being entirely conventional, and is included in block diagram form for reference purposes only. Equipment 10 comprises direct pick-up camera 11, signal processing equipment 12, color coder 13 and radio transmitter 14. Apparatus for developing the four basic timing signals: horizontal drive, vertical drive, blanking and sync are not shown, it being understood that such apparatus develops the timing signals from a master oscillator (not shown) stabilized to produce a 3.579545 mc. continuous-wave signal (the nominal 3.58 mc. color subcarrier).

Camera 11 contains a light splitting optical system 15 for the purpose of presenting a red color-separation image of the scene being televised to the sentitive surface of pick-up tube 16, termed the "red" pick-up tube; a green color-separation image to pick-up tube 17, termed the "green" pick-up tube; and a blue color-separation image to pick-up tube 18, termed the 'blue" pick-up tube. The preamplifiers and the horizontal- and vertical-scanning generators normally associated with each color channel of camera 11 have been omitted to simplify the drawing, it being understood that each channel is provided with adjustments so as to have identical characteristics. As is conventional, the drive pulses applied to each of tubes 16, 17 and 18 cause the scanning beam of each to be deflected in synchronism according to the standard odd-line interlaced scanning program; and the resultant outputs of the three tubes are applied to signal processing equipment 12 in order to accomplish gamma correction, aperture control, shading correction and pedestal insertion. As a consequence of this, there are three primary color outputs from equipment 12 labeled in the drawing R, G and B. Output R, associated with red pick-up tube 16 produces a signal proportional to the red content of the scanned picture elements, and is termed the "red video signal"; output G, associated with green pick-up tube 17 produces a signal proportional to the green content of the scanned picture elements, and is termed the "green video signal"; and output B, associated with blue pick-up tube 18, is termed the "blue video signal." Since the scanning of the photosensitive areas of the pick-up tubes is synchronized (with the three tubes in registration to provide rasters having identical sizes, shapes and positions relative to the scene being televised), the same picture element of each color-separation image is scanned simultaneously. Thus, at any instant, each video signal is representative of the brightness of a different one of the primary colors contained in the same picture element.

After gamma and other necessary corrections, the R, G and B camera signals are applied to color coder 13 in order to adapt them for compatible transmission with the existing 6 mc. television channel. The color coder accomplishes its function by the use of matrixing, suppressed-carrier modulation, quadrature modulation, VSB transmission of the I signal, and bandwidth limitation of the Q signal, together with various incidental gating, adding and subtracting operations, all of which are conventional. Matrix circuit 19 linearly combines the R, G and B signals in accordance with Eqs. 2, 3 and 4 to define the $I_w$ and $Q_w$ signals and the Y signal respectively, where the subscripts on the chrominance components indicate that they are wideband at this point in the circuit. Filters 20 and 21 limit the video frequency chrominance signals to 1.5 mc. for I and 0.5 mc. for Q; and delay lines 22 and 23 in the wider band channels equalize the time passage for all signal components. The 3.58 mc. color subcarrier is delayed 57° and split into two components, one of which is modulated at 24 with the I signal and the other of which is delayed by 90° and modulated at 25 with the Q signal. Modulators 24 and 25 are doubly balanced to produce only the sideband frequency components. Finally, the luminance signal Y, the quadrature sidebands outputs of modulators 24 and 25, deflection-sync signals and the color burst are all summed in adder 26 whose output is termed the composite video signal and constitutes the total video voltage modulated on the main picture carrier to produce the broadcast compatible color television signal previously described in detail.

Figures 2A, 2B:
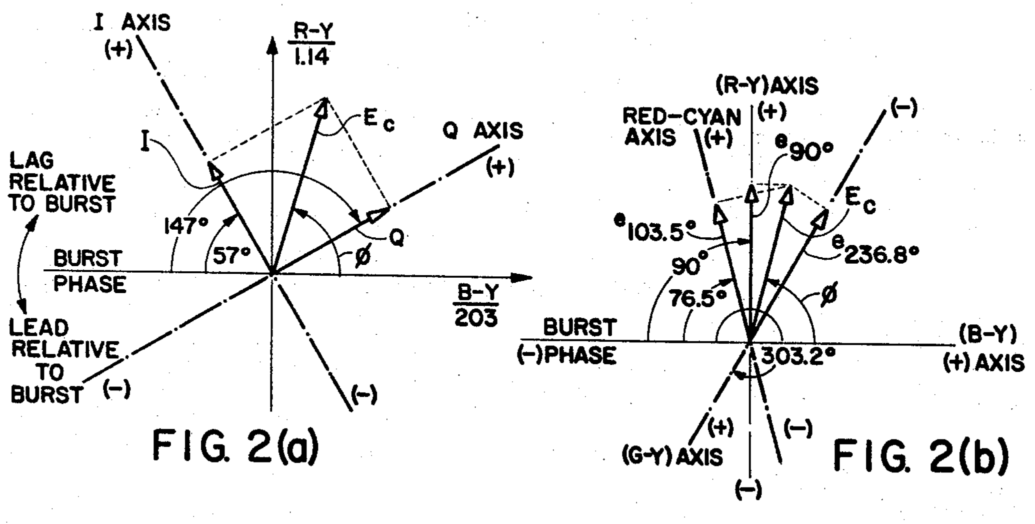
FIG. 2(*a*) is a phase diagram of the coded chrominance signal showing the amplitude and phase of the chrominance signal that results from the scan of a particular picture element.

As indicated previously, the composite video signal modulated on the main picture carrier (less sync information) comprises the Y signal and the chrominance signal, the latter being in the form of a 3.58 mc. subcarrier whose phase, when a given picture element is scanned, is determined by the dominant wavelength of the scanned element, and whose amplitude is determined by the saturation of the color. A phase diagram for the coded chrominance signal is shown in FIG. 2(*a*) to which reference is now made. The color subcarrier component on which the I signal is modulated lags the color subcarrier (burst) by 57°; and the color subcarrier component on which the Q signal is modulated lags the color subcarrier by 147°. FIG. 2(*a*) shows the instantaneous I and Q phasors resulting from the scanning of a picture element having some arbitrary combination of the three primary colors. The instantaneous $E_c$ phasor in FIG. 2(*a*), obtained by the vector addition of the I and Q phasors, indicates that the scanned picture element corresponding to this $E_c$ phasor must be bluish-red since the first quadrant of the chrominance phase diagram defines colors that lie in the range red to magenta to blue. The second quadrant defines colors in the range red to orange to yellow; the third quadrant defines colors in the range yellowish-green to green to bluish-green; and the fourth quadrant defines colors in the range cyan to blue.

The result of synchronous demodulation of the coded chrominance signal shown in FIG. 2(*a*) along three representative axes is shown in FIG. 2(*b*). Synchronous demodulation, it will be recalled, provides a demodulated signal whose amplitude is proportional to the product of the magnitude of the coded chrominance signal and the cosine of the angle between the latter signal and the decoder subcarrier reference signal. In other words, synchronous demodulation provides the projection of the coded chrominance signal on the axis identified with the phase of the decoder subcarrier reference signal. Chart B lists the color content of the demodulated signal for the axes shown in FIG. 2(*b*); and Chart A lists the phase of the decoder subcarrier reference signal necessary to demodulate along the axes listed.

Figure 4:
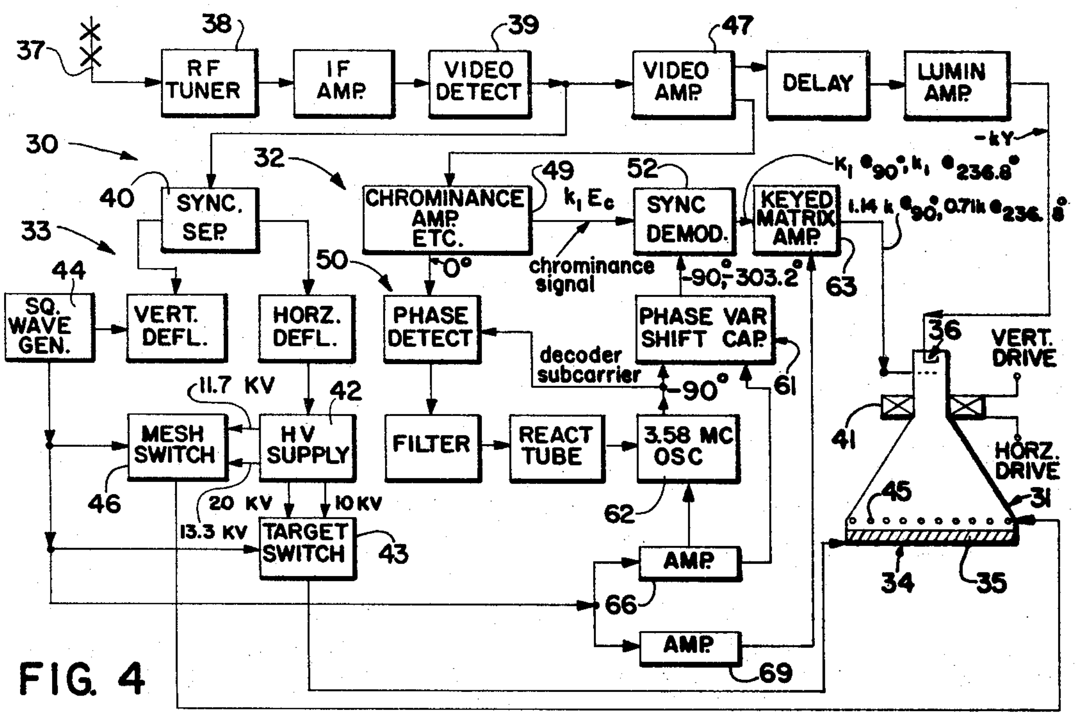
FIG. 4 is a block diagram of a television receiver constructed in accordance with the present invention showing a simplified decoder in which the demodulator functions as a switch for controlling the sequential application of the video signals to the one gun of the kinescope.

Apparatus by which the technique of obtaining essentially red and green decoder video signals by synchronous demodulation along preselected axes followed by matrixing with the luminance signal, can be applied to a one-gun kinescope that operates on the red-white principle of color analysis, is shown in FIG. 4 to which reference is now made. Reference numeral 30 designates a receiver into which such apparatus is incorporated and includes bi-color kinescope 31, decoder 32 and receiver circuitry 33. As indicated in copending application Ser. No. 297,341 referred to above. kinescope 31 includes at one end, a viewing screen 34 having a covering 35 thereon that constitutes a target for a beam of electrons produced by single electron gun 36 at the other end of the kinescope. Covering 35 can be constituted by two superposed granular cathodoluminescent layers which emit red and minus-red (cyan) light respectively, with the red light emitting layer being closer to the gun and being uniformly distributed over but covering less than 100% of the viewing screen. Additionally, a nonluminescent barrier layer separates the two cathodoluminescent layers. With this construction, about a 10 kv. accelerating (target) voltage is sufficient to excite only the red light emitting layer, with interstitial electrons of this energy that pass between the granules being stopped short of the minus-red layer by the barrier layer; and red light is produced on the screen. At higher accelerating voltages, however, interstitial electrons have sufficient energy to pass through the barrier layer and penetrate the minus-red layer whereby both the red and minus-red layers are simultaneously excited; and particularly, at about 20 kv., both layers will be simultaneously excited into emission of substantially the same amount of light whereby achromatic light is produced on the screen. Thus, red-white color switching can be achieved by modulating the accelerating voltage between 10 kv. and 20 kv.

In operation, a broadcast color television signal received at antenna 37 is converted to IF by tuner 38, amplified and then detected at 39 to produce the composite color signal that existed at the input to the transmitter at the sending end of the television system. Sync information is separated at 40 from the composite color signal and applied to the horizontal and vertical deflection generators which produce sawtooth current pules that are applied to the horizontal and vertical windings of deflection coil 41 of the kinescope to cause the beam to trace out the conventional raster in the terms of sequential interlaced fields. Associated with the horizontal deflection generator is high voltage power supply 42 which provides the 10 and 20 kv. potentials that must be applied sequentially to covering 35 by means of electronic switch 43, the action of which is synchronized with the scanning of each field of a frame by the output of square wave generator 44 producing a square wave at the field frequency and synchronized with the vertical pulses derived from the vertical deflection circuit. As a result of this arrangement, the voltage on covering 35 remains at 10 kv. during one field scan of the covering by the beam to produce a red field, and at 20 kv. during the next field scan to produce a white field interleaved with the red field.

Figure 5:
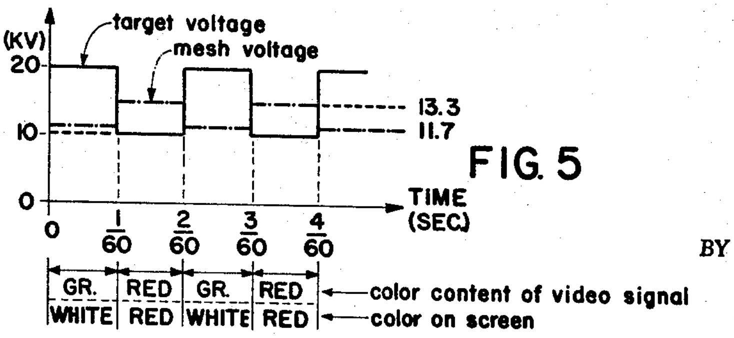
FIG. 5 is a synchronization diagram showing how color switching is obtained and the relationship between the color of the video and the color of the screen.

Modulation of the target voltage at the field frequency normally results in the red field being larger than the white field with the result that images reproduced during successive fields will not be in registration unless compensation is provided. To this end, it is conventional to provide an electron permeable mesh designated by reference numeral 45 between the gun and covering 35, and as close to the latter as possible but electrically insulated from the covering. As indicated in copending application Ser. No. 344,914, filed Feb. 14, 1964, and owned by the assignee of the present application, misregistration between the two fields can be reduced to a minimum by applying a voltage to mesh 45 that is modulated in synchronism but 180° out-of-phase with modulation of the target voltage. In particular, good registration is achieved in kinescopes where the target voltage is modulated between 10 and 20 kv. when the mesh voltage is modulated about an average voltage of 12.5 kv. with a peak-to-peak signal of about 1600 volts. These desired voltages can be obtained from power supply 42 and applied to mesh 45 by way of electronic switch 46, the action of which is synchronized with the scanning of each field by the output of square wave generator 44. The sequence and phase relationships between the target and mesh voltages are indicated in FIG. 5, which also indicates that reproduction of the scene in color requires a video signal based on the green content of the scene being televised to be applied to the gun during the time intervals that the target voltage is maintained at 20 kv., and on the red content during the time intervals that the target voltage is maintained at 10 kv.

It is the function of decoder 32 to provide video signals based on the red and green contents of the scene being televised and to sequentially present such signals to the gun of the kinescope properly synchronized with the color switching operation. In operation, the composite color signal at the output of detector 39 is amplified at 47 and in a conventional manner, the chrominance and luminance components of the composite color signal are separated. The chrominance signal is selected by the chrominance amplifier, which, typically, may include a bandpass "take-off" filter, the amplifying tube, a "shaping" filter plus trapping against 4.5 mc., all indicated schematically at 49. The selected chrominance signal is applied via the "burst take-off" connection to a gated amplifier (not shown) which, under control of the horizontal flyback pulses, transmits color bursts to the APC (automatic phase control) circuit 50. This is a conventional approach to providing an error signal to control the decoder subcarrier phase and forms no part of the present invention.

As previously indicated, the function of decoder 32 is to sequentially synchronously demodulate the chrominance signal along the positive $(R-Y)$ axis and the positive $(G-Y)$ axis at the field frequency. Along the positive $(R-Y)$ axis, the demodulated signal is:

$$e_{90°}=0.877(R-Y)$$

which means that the unadulterated red video signal associated with the red pick-up tube of the cameras can be obtained using the kinescope as the matrix if the red color difference signal is obtained as follows:

$$R-Y=1.14(e_{90°})$$

On the other hand, along the positive $(G-Y)$ axis, the demodulated signal is:

$$e_{236.8°}=1.42(G-Y)$$

which means the unadulterated green video signal associated with the green pick-up tube of the camera can be obtained using the kinescope as the matrix, if the green color difference signal is obtained as follows:

$$G-Y=0.71(e_{236.8°})$$

Figure 3:
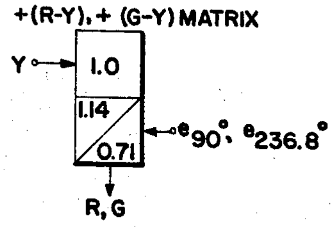
FIG. 3 shows a matrix arrangement for generating from the demodulated chrominance signal a pair of decoder red and green video signals suitable for use by a red-white color kinescope.

Decoder 32 provides a simple device for the recovery of unadulterated color signals. Decoder 32 requires no video switch because the proper color difference signal is automatically applied to the grid of the kinescope as a result of switching the angle at which demodulation occurs; and multiple matrices are eliminated by the use of a keyed matrix-amplifier whose operation is synchronized with the angle at which demodulation occurs to provide the matrixing operation necessary to achieve the desired color-difference signal. The total matrixing operation, including that achieved using the grid of the kinescope as well as the matrix amplifier, is schematically illustrated in FIG. 3 where the operations, carried out sequentially, are as follows:

$$R=1.14(e_{90°})-Y$$
$$G=0.71(e_{236.8°})-Y$$

Figures 6, 7:
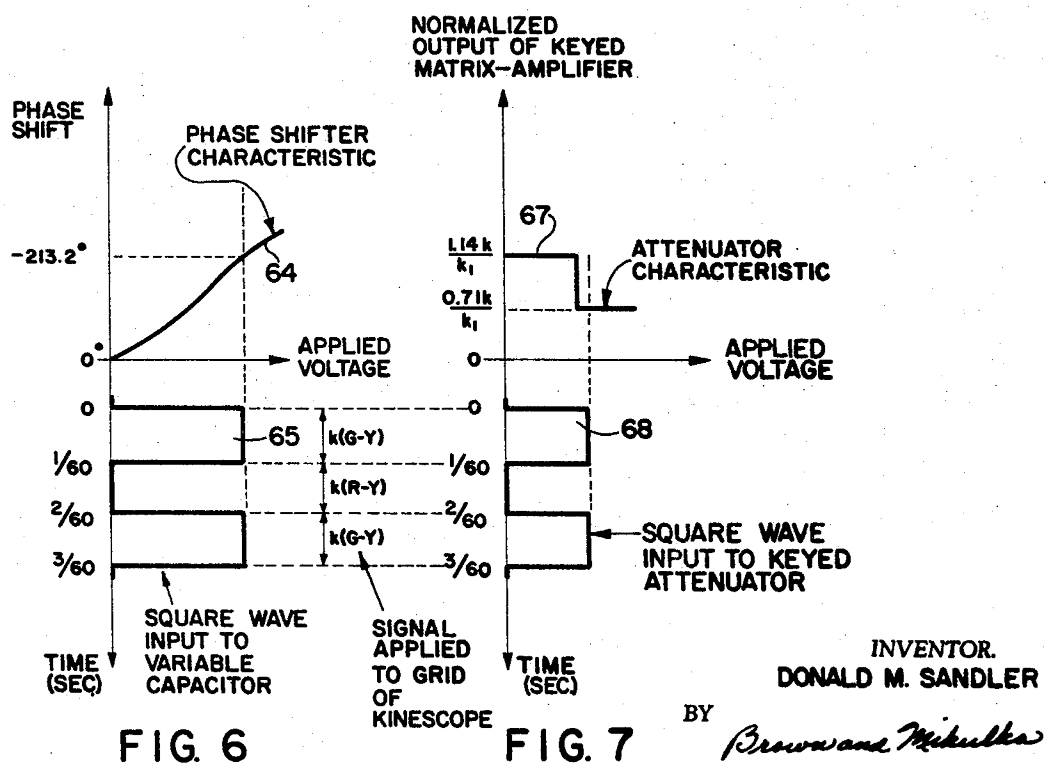
FIG. 6 is typical of the response characteristic of a modulated phase shifter.
FIG. 7 is typical of the response characteristic of a voltage-sensitive variable attenuator which is part of a keyed matrix-amplifier.

In FIG. 4, the phase shifter shown at 61 is provided with means for varying the angular shift of the output of the 3.58 mc. oscillator shown at 62 to accomplish sequential demodulation at different phase angles. Assuming that the phase of the output of oscillator 62 lags by 90° the phase of the burst, it is evident from chart B that phase shifter 61 must vary the phase of the decoder subcarrier reference signal applied to synchronous demodulator 52 between 0° and −213.2° (which is the same as −90° and −303.2° respectively relative to the burst) at the field frequency. This can be accomplished by the use of a voltage-variable capacitor element in the phase shifter, as for example, a reactance tube. Preferably, however, a variable capacitor diode is used. In either event, the phase shifter 61 will have some characteristic that relates phase shift to the voltage applied to the variable capacitor element in a manner suggested by wave 64 in FIG. 6. This establishes the amplitude of the square wave indicated by curve 65 that must be applied to the variable capacitor element, and it is the function of amplifier 66 to furnish the required signal. Amplifier 66 is driven by square wave generator 44 so that the phase shifter sequentially varies the phase of the decoder subcarrier reference signal between 0° and −213.2° relative to the output of the subcarrier oscillator at the field frequency.

Demodulator 52 and keyed matrix-amplifier 63 represent a demodulator-matrix channel whose characteristic has a value depending upon circuit parameters. For example, if the input to decoder 32 were $K_1E_c$, where $K_1$ is a constant defining the voltage level after detection, the demodulator-matrix must have characteristics of 1.14 $K/K_1$ to provide an output of $K(R-Y)$ when the local or decoder subcarrier produced by oscillator 62 has an angle of −90° relative to the phase of the burst, and 0.71 $K/K_1$ to provide an output of $K(G-Y)$ when the angle is −303.2°. The value K is a constant of proportionality. In other words, the characteristic of the channel must decrease by a factor of about 38% when the phase of the reference signal changes from 0° to −213.2°. This can be accomplished, for example, by using conventional diode waveshaping techniques whereby the application of a square wave signal to a diode of a voltage-sensitive variable attenuator circuit would shift the attenuation of the output of demodulator 52 by the required amount in synchronism with the shifting of the angle at which demodulation occurs. The characteristic of the keyed matrix-amplifier, of which the voltage-sensitive variable attenuator is a portion, may have the shape shown at 67 in FIG. 7. The break in the curve 67 results from a change in the state of conduction of the diode of the variable attenuator, and establishes the amplitude of the square wave indicated by curve 68 that must be applied to variable attenuator circuit; and it is the function of amplifier 69, driven by generator 44, to furnish the required signal.

The sequence of operations of the receiver shown in FIG. 4 is controlled by square wave generator 44. When the output of the latter causes target switch 43 to apply 20 kv. to the target and mesh switch 46 to apply 11.7 kv. to the mesh, the output of amplifier 66 causes the capacitance associated with phase shifter 61 to have a value which places the phase of the decoder subcarrier reference signal applied to demodulator 52 at —303.2° relative to the burst (or —213.2° relative to the output of oscillator 62). The output of demodulator 52 under this condition is $K_1e_{236.8°}$ which, as was shown previously, is 1.42 $K_1(G-Y)$. At the same time, the output of amplifier 69 applied to matrix-amplifier 63 causes the variable attenuator to have a value which results in the output of demodulator 52 ($K_1e_{236.8°}$) being multiplied by the factor 0.71 $K/K_1$. This yields $K(G-Y)$ at the grid of the gun of kinescope 31. The output of the luminance amplifier is —KY and this is applied to the cathode of the gun. Since the resultant signal on the gun is the difference between the grid and cathode voltage, the video signal controlling the intensity of the beam during the time a field in achromatic light is traced on the viewing screen is KG, a signal proportional to that associated with the green pick-up tube at the camera. When the vertical sync pulse switches the output of the square wave generator such that 10 kv. is switched onto the target by switch 43 and 13.3 kv. is switched onto the mesh by switch 46 for the next field scan, the output of amplifier 66 causes demodulation to switch from 90° to 236.8° (or from —90° to —303.2° respectively, relative to the burst); and the output of amplifier 69 causes the matrix-amplifier to multiply the output of demodulator 42, now $K_1e_{90°}$, by the factor 1.14 $K/K_1$. This yields the signal $K(R-Y)$ at the grid of the gun. The kinescope again performs matrixing with the Y signal. Thus, during the time a field in red light is traced on the viewing screen, the video signal KR proportional to that associated with the red pick-up tube at the camera, controls the intensity of the beam. As already indicated, this is the requirement for reproducing a scene in full color using the red-white system of color analysis.

The approach to decoding using the kinescope to perform a portion of the matrixing achieves the same end results as when all of the matrixing is carried out without the use of the kinescope. For this reason, the term "matrixing" as used in the claims is intended to cover both approaches.

While the preferred embodiment just described provides a keyed matrix-amplifier at the output of the synchronous demodulator, those skilled in the art will appreciate that the variable attenuator portion of the matrix-amplifier could be inserted, instead, in either input to the demodulator.

The embodiment of the invention described above, while particularly well adapted for reproducing a scene in color using the red-white system of color analysis, can be used to advantage in conventional two-color television systems, as, for example, in a red and green system, or in an orange-red and blue-green system. In the latter case, the orange-red content of the scene is reproduced in orange-red light and the blue-green content of the scene is reproduced in blue-green light. Two-color television displays, of which red-white is a special case, are particularly well adapted for use in converting a standard monochrome receiver to a color receiver. As the result of the disclosure of Engstrom et al. in U.S. Patent No. 2,514,043 granted July 4, 1950, those skilled in the art know that a standard monochrome kinescope can be fitted with auxiliary apparatus by which the "two primary colors" of a given system of color analysis can be caused to appear sequentially on the viewing screen of the kinescope at the field frequency. Using the orange-red and blue-green system, for example, rotating color polarizers mounted between an observer and the monochrome kinescope and properly synchronized with the scanning system, will cause the screen to appear, sequentially, orange-red and blue-green. In such case, the sequential signals that must be supplied to the control grid of the monochrome receiver in synchronism with the color of the viewing screen should be a pair of signals corresponding to an orange-red color difference signal and a blue-green color difference signal.

The embodiment of the invention shown in FIG. 4 is also adapted to be used with a standard three-color sequential television system of the type disclosed by V. K. Zworykin in U.S. Patent No. 2,566,713 granted Sept. 4, 1951. In such case, demodulation would occur sequentially at 90°, to provide the red color difference signal; at 236° to provide the green color difference signal; and at 0° to provide the blue color difference signal. In order to provide the proper relative gain between the different color difference signals, a two-diode voltage-sensitive variable attenuator could be used whereby the keyed matrix-amplifier would multiply the output of the synchronous demodulator by 1.14 $K/K_1$ when the demodulation angle is 90°; by 0.71 $K/K_1$ when the demodulation angle is 236.8°; and by 2.03 $K/K_1$ when the demodulation angle is 0°.

Since certain changes may be made in the above method and apparatus without departing from the scope of the invention herein claimed, it is intended that all matter contained in the above description or shown in the accompanying drawings shall be interpreted as illustrative and not in a limiting sense.

What is claimed is:

1. A television receiver for reproducing a scene being televised in color using the red-white system of color analysis from a color television signal transmitted by modulating on the main picture carrier of a television channel a composite video signal that includes a luminance signal matrixed from the red, green and blue content of a scanned element and representative of its brightness, a coded chrominance signal in the form of a subcarrier of predetermined frequency whose amplitude and phase are functionally related to the saturation and dominant wavelength respectively of the scanned element, and a sync signal to which the phase of said chrominance signal is referred; said receiver comprising:

(a) means for synchronously demodulating said coded chrominance signal with a local oscillator signal at said predetermined frequency and with a predetermined phase relative to said sync signal to obtain a demodulated chrominance signal;

(b) means including voltage-variable capacitance means for causing said predetermined phase to sequentially switch between two values;

(c) means to matrix said luminance signal and said demodulated chrominance signal to obtain a pair of sequential signals, the first of which is obtained when said predetermined phase has one of said two values and is functionally related to substantially only the red content of said scanned element; and the second of which is obtained when said predetermined phase has the other of said two values and is functionally reltaed to substantially only the green content of said scanned element;

(d) a kinescope having a viewing screen with red and minus red phosphor materials thereon, the selective excitation of said red phosphor material causing said screen to emit reddish light and the simultaneous excitation of both of said phosphor materials causing said screen to emit substantially achromatic light; and a single electron gun for producing an electron beam focused to impinge on said screen to excite said phosphor materials;

(e) means to cause said beam to selectively excite one or both of said materials for sequentially producing reddish and achromatic light on said screen; and (f) means for causing said first of said pair of signals to modulate the intensity of said beam when only said red phosphor material is excited, and means for causing said second of said pair of sequential signals to modulate the intensity of said beam when both of said red and minus red phosphors are excited.

References Cited

UNITED STATES PATENTS

| | | | |
|---|---|---|---|
| 2,921,118 | 1/1960 | Benjamin | 178—5.4 |
| 2,955,152 | 10/1960 | Keizer | 178—5.4 |
| 3,242,260 | 3/1966 | Cooper et al. | 178—5.4 |

ROBERT L. GRIFFIN, *Primary Examiner.*

DAVID G. REDINBAUGH, *Examiner.*

J. A. O'BRIEN, R. MURRAY, *Assistant Examiners.*